(12) United States Patent
Adam

US009006369B2

(10) Patent No.: US 9,006,369 B2
(45) Date of Patent: Apr. 14, 2015

(54) WATER BASED LIGNIN EPOXY RESINS, METHODS OF USING AND MAKING THE SAME

(75) Inventor: Georgius Abidal Adam, Edensor Park (AU)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/814,866

(22) PCT Filed: Aug. 1, 2012

(86) PCT No.: PCT/US2012/049178
§ 371 (c)(1),
(2), (4) Date: Feb. 7, 2013

(87) PCT Pub. No.: WO2014/021887
PCT Pub. Date: Feb. 6, 2014

(65) Prior Publication Data
US 2014/0039146 A1 Feb. 6, 2014

(51) Int. Cl.
*C08H 6/00* (2010.01)
*C08H 8/00* (2010.01)
*C08H 7/00* (2011.01)

(52) U.S. Cl.
CPC ........................... *C08H 6/00* (2013.01)

(58) Field of Classification Search
None
See application file for complete search history.

(56) References Cited

U.S. PATENT DOCUMENTS

| | | | |
|---|---|---|---|
| 2,709,696 A | 5/1955 | Wiest et al. | |
| 3,407,188 A | 10/1968 | Cavagna et al. | |
| 3,718,639 A | 2/1973 | Falkehag et al. | |
| 3,991,022 A | 11/1976 | Dimitri | |
| 4,113,675 A * | 9/1978 | Clarke et al. | 524/799 |
| 4,204,984 A | 5/1980 | Neubert | |
| 4,732,572 A | 3/1988 | Dilling | |
| 4,918,167 A | 4/1990 | Glasser et al. | |
| 5,066,790 A | 11/1991 | Glasser et al. | |
| 2008/0262182 A1* | 10/2008 | Funaoka | 527/401 |
| 2009/0209739 A1 | 8/2009 | Funaoka et al. | |
| 2011/0098384 A1* | 4/2011 | Blount | 524/35 |
| 2011/0213057 A1 | 9/2011 | Fenn et al. | |

FOREIGN PATENT DOCUMENTS

| | | |
|---|---|---|
| IQ | 2311 | 11/1990 |
| IQ | 2504 | 11/1993 |
| IQ | 2646 | 4/1997 |

OTHER PUBLICATIONS

International Search Report and Written Opinion for PCT/US2012/049178 dated Dec. 19, 2012.
Adam et al., Thermosetting characteristics of some new polymethylol epoxy resins, *Thermochimica Acta* (Jan. 1, 1987), 109(2):297-301 (Abstract).
Adam, Chemistry and technology of methylolic resins, their derivatives and IPNs, *National Journal of Chemistry* (2001), 1:131-137.
Belgacem et al., Monomers, Polymers and Composites from Renewable Resources, First Edition, Elsevier Science (Jun. 3, 2008).
Busch et al., The utilization of renewable resources in German industrial production, *Biotechnol. J.* (2006), 1:770-776.
Chen et al., A Brief History of Lignin-Containing Polymeric Materials Culminating in X-ray Powder Diffraction Analyses of Kraft Lignin-Based Thermoplastic Polymer Blends, *ACS Symposium Series* (Apr. 16, 2007), 954:229-246 (Abstract).
Gellerstedt et al., Towards a new concept of lignin condensation in kraft pulping. Initial results, *Comptes Rendus Biologies* (Sep.-Oct. 2004), 327(9-10):817-826 (Abstract).
Heitner et al., Lignin and Lignans: Advances in Chemistry, CRC Press (Jun. 14, 2010).
Hirose et al., Chapter 9: Synthesis and Thermal Properties of Epoxy Resins Derived from Lignin, Recent Advances in Environmentally Compatible Polymers (Jan. 2001), p. 73 (Abstract).
Hofmann et al., Engineering Plastics From Lignin. 21. Synthesis and Properties of Epoxidized Lignin-Poly(Propylene Oxide) Copolymers, *Journal of Wood Chemistry and Technology* (Sep. 24, 2006), 13(1):73-95.
Hu, Chemical Modification, Properties, and Usage of Lignin, Springer (2002), pp. 291 (Abstract).
Khalaf et al., Calorimetric Investigation of Curing of Some New Polyhydroxy Epoxy Resins, *Thermochimica Acta* (1987), 111:115-120.
Kishi et al., Wood-Based Epoxy Resins and the Ramie Fiber Reinforced Composites, *Environmental Engineering and Management Journal* (Sep.-Oct. 2008), 7(5):517-523.
Macoveanu et al., Environmental Engineering and Management Journal, An International Journal (Sep./Oct. 2008), 7(5):1-162.
Mai et al., Composite Technologies 2020: Proceedings of the Fourth Asian-Australasian Conference on Composite Materials ACCM 4 (Jun. 2004).
Malutan et al., Contribution to the Study of Hydroxymetylation Reaction of Alkali Lignin, *BioResources* (2008), 3(1):13-20.
Malutan et al., Lignin Modification by Epoxidation, *BioResources* (2008), 3(4):1371-1376.
Mansouri et al., Synthesis and Characterization of Kraft Lignin-Based Epoxy Resins, *BioResources* (2011), 6(3):2492-2503.
Nieh et al., Lignin Epoxide Synthesis and Characterization, *ACS Symposium Series* (Jul. 31, 1989), 397:506-514 (Abstract).
Nonaka et al., Synthesis of Lignin/Epoxy Resins in Acqueous Systems and Their Properties, *Holzforschung* (1997), 51(2):183-187 (Abstract).
Nouailhas et al., Synthesis and Properties of Biobased Epoxy Resins. Part 1. Glycidylation of Flavonoids by Epichlorohydrin, *Journal of Polymer Science Part A: Polymer Chemistry* (Mar. 28, 2011), 49:2261-2270.
Raschip et al., Semi-interpenetrating polymer networks containing polysaccharides. II. Xanthan/lignin networks: a spectral and thermal characterization, *High Performance Polymers* (Mar. 18, 2011), 23(3):219-229 (Abstract).

(Continued)

*Primary Examiner* — James J Seidleck
*Assistant Examiner* — Peter A Salamon
(74) *Attorney, Agent, or Firm* — Pepper Hamilton LLP

(57) ABSTRACT

Water based lignoepoxy resins, and methods for their preparation and use are provided. Methods of making lignoepoxy resins without the use of volatile organic compounds are also provided.

17 Claims, 1 Drawing Sheet

(56) References Cited

OTHER PUBLICATIONS

Simionescu et al., Lignin/epoxy composites, *Composites Science and Technology* (1993), 48(1-4):317-323 (Abstract).

Sjostrom, Fundamentals and Application, Wood Chemistry Second Edition, Academic Press (1993).

Sun et al., Comparative study on the curing kinetics and mechanism of a lignin-based-epoxy/anhydride resin system, *Polymer* (Jan. 5, 2007), 48(1):330-337 (Abstract.

Tomita et al., Ozonized Lignin-Epoxy Resins, *ACS Symposium Series* (Jul. 31, 1989), 397:496-505 (Abstract).

Wongsiriwan et al., Lignocellulosic Biomass Conversion by Sequential Combination of Organic Acid and Base Treatments, *Energy Fuels* (Apr. 26, 2010), 24(5):3232-3238 (Abstract).

Wool et al., Bio-Based Polymers and Composites, Academic Press, Edition 1 (Jul. 15, 2005).

Zhao et al., Synthesis of lignin base epoxy resin and its characterization, *Journal of Materials Science Letters* (May 1, 2001), 20(9):859-862 (Abstract).

Busch, et al., Use of Renewable Resources in the Industrial Fabric Production, *Chemical Engineering & Technology* (Mar. 1, 2006), 78(3):219-228.

Busch et al., The Use of Renewable Resources in German Industrial Production, *Biotechnology Journal* (2006), 1:770-776.

Funabashi, et al., Mechanical and Thermal Properties of Composites of Epoxy Resins Derived from Kraft Lignin Filled with Cellulose Particlesa, *Composite Technologies for 2020*, Woodhead Publishing Limited (2004), pp. 57-61.

Hofman et al., Recent development in epoxy resins, *Polymer Preprints*, 31(1):657-659 (Apr. 1990).

\* cited by examiner

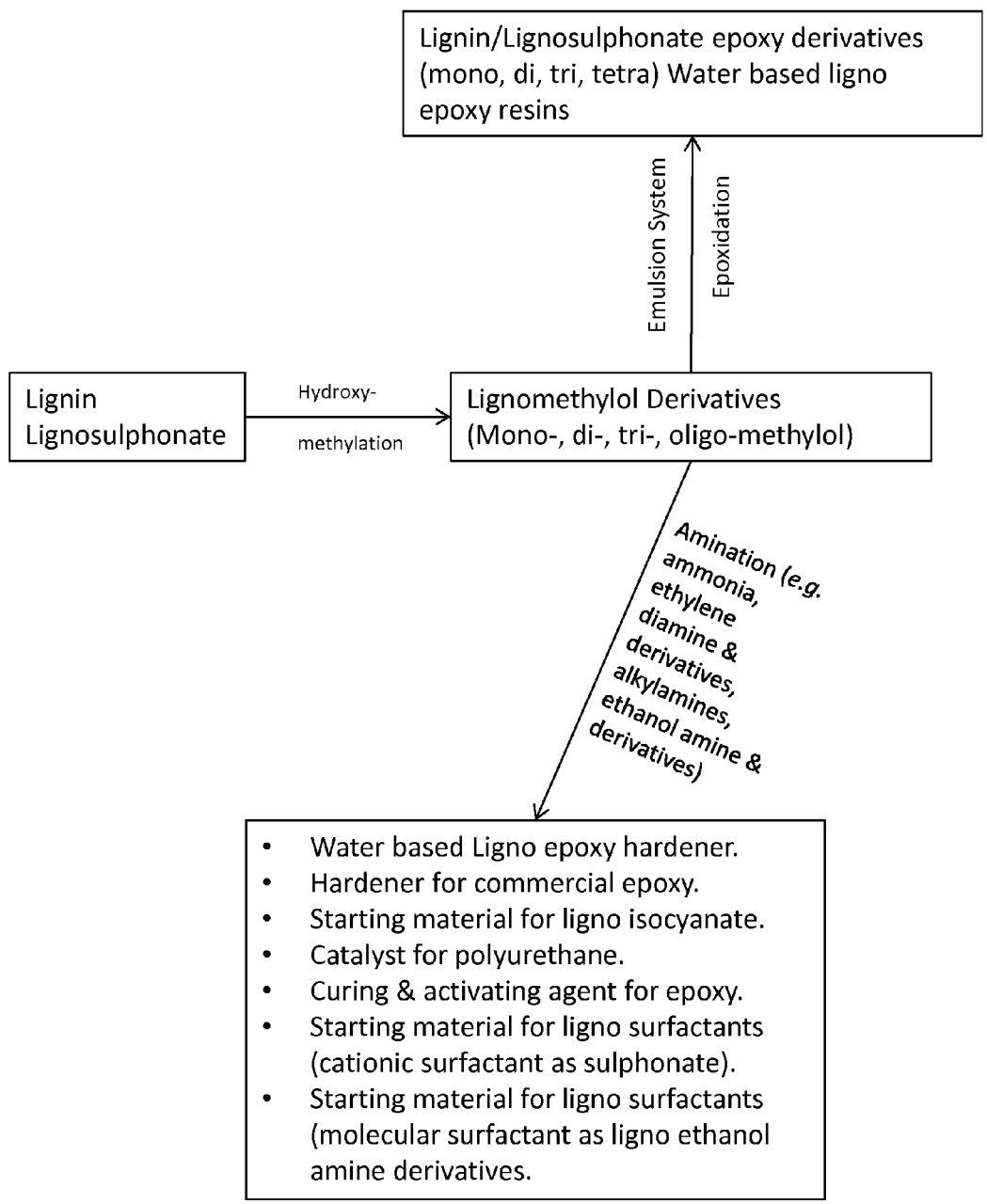

WATER BASED LIGNIN EPOXY RESINS, METHODS OF USING AND MAKING THE SAME

CROSS-REFERENCE TO RELATED APPLICATIONS

This application is a U.S. national stage filing under 35 U.S.C. 371 of International Application No. PCT/US2012/49178 filed Aug. 1, 2012, entitled "WATER BASED LIGNIN EPDXY RESINS, METHODS OF USING AND MAKING THE SAME," which is incorporated by reference in its entirety.

FIELD

Water based lignin epoxy resins, water based ligno amine hardeners and lignin based catalysts and activators, methods of making, and uses thereof are provided.

BACKGROUND

Epoxy resins are one of the important classes of polymeric resins used in various fields of applications such as electrical industries, adhesives, coating, as well as composite material with various reinforcing materials such as carbon fibres, Aramide, Kevlar, polyesters and fibre glass and as concrete polymer additives.

Most of the epoxy resins are from petrochemical resources, the non-renewable resources with growing costs. The epoxy resin industry generates considerable pollution since more than 60% of the epoxy resins consumed require organic solvents and diluents such as xylenes, toluene, petroleum ethers, oils and volatile organic compounds (VOC).

Several types of additives and activators are used with epoxy resins such as phenols and tertiary amines as curing activators. The polluting nature of phenols and tertiary amines is well established due to their extremely high reactivity and volatility. Accordingly, most current European standards require phenol free and zero volatile organic content (VOC) for industrial products.

Lignin is an aromatic polyphenol that is a naturally occurring renewable product. Lignin can be obtained as a waste by-product of the paper industry. Millions of tonnes are produced industrially at a significant environmental and economic cost to the industry. Currently, lignin waste must be transformed from black liquor to semi-solid waste (about 85% lignin) and then dumped or burned, all at significant cost (economically and environmentally).

Lignin represents 15-35% of wood, and accordingly is the most abundant renewable organic material on the earth. Pulping industries separate cellulose from the wood composition leaving lignin and hemicelluloses as waste by-products known as black liquor. In the sulphite process pulp industries the main by-product is lignosulphonate. The global annual production capacity is about 1.8-2.0 million tons. Each ton of pulping products produces 330-540 kg of lignosulphonate. Most of the lignosulphonate (66%) produced in pulping industries is burned (resulting in significant $SO_2$ pollution) and 34% is treated and dumped which is costly.

Therefore, there is a need to develop water based lignins that do not have the economic or environmental costs associated with the prior use and handling of lignins. The embodiments provided herein satisfy this need as well as others.

SUMMARY OF THE INVENTION

Embodiments provide methods of making a lignomethylol or a lignosulphonatemethylol, the method comprising contacting a lignin or a lignosulphonate with formaldehyde or paraformaldehyde or glyoxal under conditions sufficient to produce the lignomethylol or the lignosulphonatemethylol.

In some embodiments, methods comprising epoxidizing the lignomethylol or the lignosulphonatemethylol under basic pH conditions to produce a lignomethylol epoxy or a lignosulphonatemethylol epoxy are provided.

In some embodiments, the lignomethylol has a formula of:

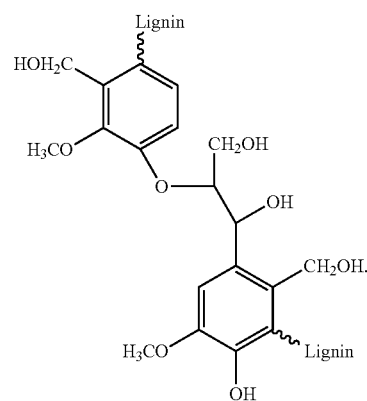

In some embodiments, methods are provided that comprise contacting the lignomethylol or the lignosulphonate methylol with ammonia or other diamino compounds to produce aminolignin derivatives.

In some embodiments, the aminolignin derivative has a formula of Formula I,

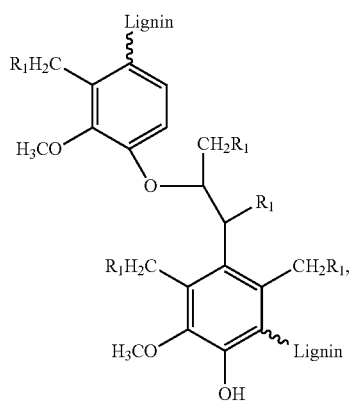

wherein each $R_1$ is independently selected from the group consisting of $NH_2$, $-NHCH_2CH_2NH_2$, diethylenetriamine, trieethylenetetraamine, tetraethylenepentaamine, hydroxylamine, hydrazine, monoethanoloamine, diethanolamine, and triethanolamine.

In some embodiments, methods comprising drying the water soluble aminolignin are provided.

In some embodiments, methods comprising contacting the amino lignin with ethanolamine, a hydroxycarboxylic acid salt, a polyhydroxycarboxylic acid, an isocyanate terminated polyalkylene oxide, an epichlorohydrine, a hydroxycarboxylic acid salt, or a polyhydroxylic acid salt to produce a surfactant are provided.

In some embodiments, methods comprising contacting the aminolignin with epichlorohydrine at a temperature of about 0-10° C. to produce a ligno aminoepoxy resin are provided.

In some embodiments, the ligno aminoepoxy resin has a formula of:

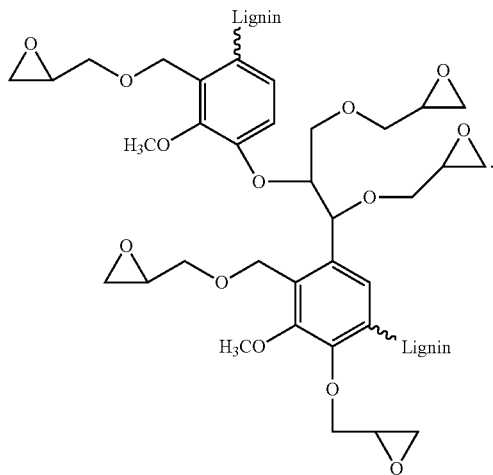

In some embodiments, methods comprising contacting the ligno amino resin with phosgene, carbon monoxide, or carbon dioxide to produce a lignoisocyanate derivatives are provided.

In some embodiments, a product produced by any method described herein does not comprise a volatile organic compound.

In some embodiments, methods of curing an ligno amino epoxy resin, the method comprising contacting the ligno aminoepoxyresin with a water soluble aminolignin according to their epoxy equivalent weight for a sufficient time at room temperature until the resin is cured are provided.

In some embodiments, compositions comprising one or more of amino lignin derivatives, lignoethylenediamine derivatives, lignodiethylenetriamine derivatives, lignotriethylenetetramine derivatives, lignoethanolamine derivatives, lignodiethanolamine derivatives, lignotriethanolamine derivatives, lignohydrazine derivatives, lignohydroxylamine derivatives, or lignoisophoronediamine derivatives, or any combination thereof are provided.

In some embodiments, a composition has a formula of

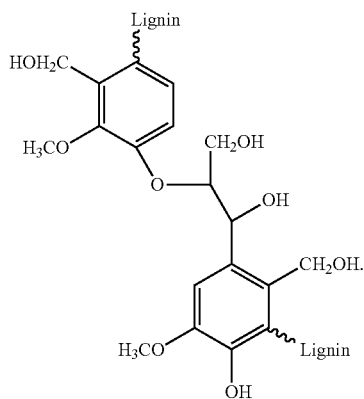

In some embodiments, the composition has a formula of Formula I,

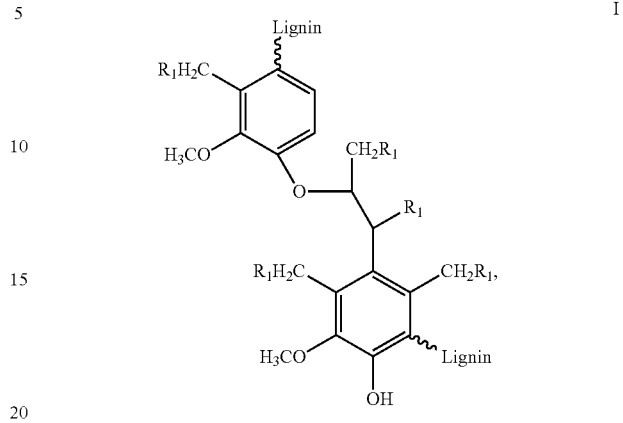

wherein each $R_1$ is independently selected from the group consisting of $NH_2$, $NH_2CH_2CH_2NH_2$, diethylenetriamine, triethylenetetraamine, tetraethylenepentaamine, hydroxylamine, hydrazine, monoethanoloamine, diethanolamine, and triethanolamine.

In some embodiments, the composition has a formula of

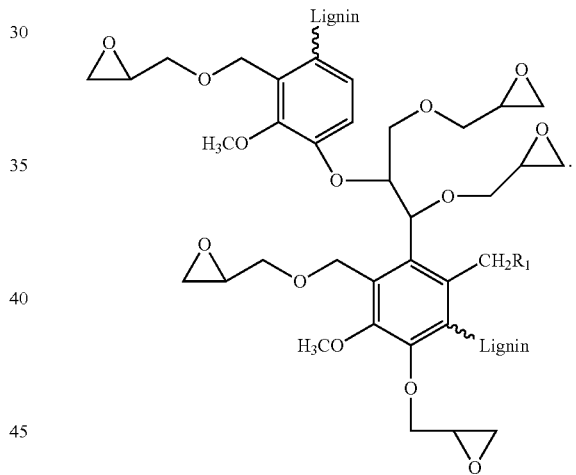

BRIEF DESCRIPTION OF DRAWINGS

FIG. 1 shows a general schematic of representative embodiments provided herein.

DETAILED DESCRIPTION

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail.

It must also be noted that as used herein and in the appended claims, the singular forms "a", "an", and "the" include plural reference unless the context clearly dictates otherwise.

As used in this document, terms "comprise," "have," and "include" and their conjugates, as used herein, mean "including but not limited to." While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

The embodiments provide, for example, an improved and more efficient chemical reaction used to transform lignin pulping industry waste to methylol lignin derivatives, methylol lignosulphonate (e.g., mono, di, trimethylols) then transferred to epoxy resins using an emulsion system procedure for epoxidation of lignin, lignin methylol, and methylol lignosulphonate (e.g., mono, di, tri and oligo) resulting in epoxy resins with high epoxy index, water based, self-emulsifying, stable epoxy system.

Embodiments, provided herein, provide amination of the lignin, lignosulphonate and methylollignosulphonate to produce water soluble aminolignin derivatives. These can be used, for example, as curing agents for water based epoxy resins.

The present disclosure also provides reactions to transform the lignoamine derivatives via an epoxidisation reaction to form novel water based lignoamine epoxy resins. In some embodiments, the lignoepoxy derivatives do not require addition of any phenolic activator or triamines commonly used with most epoxy resins because the lignophenolic groups behave as activators for epoxy resins. Treatment of lignin with acid produces active polyphenols with high activating efficiency as modified lignin starting material for both water based lignoepoxy resins and for other commercial epoxy resins. This is performed without the need for volatile polluting phenols and triamines. An example of the processes that are provided is shown in FIG. 1.

The embodiments provided herein provide significant surprising advantages over existing technologies. For example, the present embodiments produce water based lignoepoxy resins without the use of volatile organic compounds as solvents or diluents. In contrast, most commercial epoxy resins for coating and other applications use aromatic organic solvents and diluents. The water based lignoepoxy resins produced herein, however, can be produced from lignin and lignosulphonate that can be recovered from, for example, pulping industry waste. In contrast, prior commercial epoxy resins were based upon the use petrochemical resources, such as oil. The water based lignoepoxy resins are less expensive to make, and safer for the environment because of the absence of volatile organic compounds. The water based lignoepoxy resins produced according to the methods described herein are already active and do not require the use of toxic volatile phenols or volatile tertiary amines as curing activators. This is because ligno poly phenols can act as curing activators and the activation can be induced, for example, by the addition of excess amount of ligno polyphenols. The water based lignoepoxy resins are safe, nonvolatile, nontoxic, highly active curing agents that are produced from lignin waste and are, therefore, a sustainable resource. In contrast, prior epoxy curing agents were amines or polyamines, which are volatile, toxic, and/or carcinogenic and are not produced from a sustainable resource. The presently described water based lignoepoxy resins are more flexible for industrial application because they can be tailored to produce several types of monomers, raw materials, additives, or surfactants The presently described cured resins derived from the water based lignoepoxy resins have a higher glass transition temperature than most common commercial epoxy resins, which provides more uses. Additionally, the presently described embodiments produced epoxy resins that have high epoxy index. In some embodiments, the epoxy index is about, or at least 3.2%.

Accordingly, methods for producing the water based lignoepoxy and related resins are provided. The resins can then be used in a variety of applications.

Embodiments described herein provide methods of making a lignomethylol or a lignosulphonate methylol. In some embodiments, the method comprises contacting a lignin or a lignosulphonate with an aldehyde under conditions sufficient to produce the lignomethylol or the lignosulphonate methylol. Examples of the aldehyde include, but are not limited to, formaldehyde, paraformaldehyde or glyoxal, or any combination thereof. The lignomethylols or lignosulphonate methylols can be, for example, mono, di, tri and tetra methylol. The lignomethylols or lignosulphonate methylols can be produced by, for example, converting the basic alkaline solution of lignin or lignosulphonate to their methylolic resin. The conversion can be performed, for example, by a condensation reaction with the aldehyde. The conditions for the condensation can be modified according to the specific lignin or lignosulphonate and the resin to be made. The conditions that can be varied include, but are not limited to, temperature, pH, reactant ratio and time of reaction. In some embodiments, the reaction conditions are those listed in Table 1-3, which is shown below.

In some embodiments, the method further comprises epoxidizing the lignomethylol or the lignosulphonate methylol under basic pH conditions to produce a lignomethylol epoxy or a lignosulphonate methylol epoxy. In some embodiments, the reaction occurs by contacting the methylol with epichlorohydrine at 60-70° C. in the emulsion system. In some embodiments, the emulsion system comprises butanone, water, and epichlorohydrine (ratio of about 1:1:1) in the presence of 2% emulsifier at pH of about 9-10.

In some embodiments, the basic pH conditions are a pH of about 9 to about 11, about 9.5 to about 10.5, or about 10. The reaction can occur, for example, in the presence of epichlorohydrine to form an epoxy. In some embodiments, the epoxidizing step is performed at a temperature of about 50 to about 80, about 60 to about 80, about 70 to about 80, about 60 to about 70, about 60 to about 65, or about 65 to about 70° C. In some embodiments, the epoxidizing is performed in an emulsion system. In some embodiments, the emulsion system comprises ketone, water, epichlorohydrine and emulsifier. In some embodiments, the weight ratio of the butanone:water: epichlorohydrine is 1:1:1. In some embodiments, the emulsion system comprises the emulsifier such as cetrimide (cetyltrimethylammonium bromide) or other nonionic surfactants. In some embodiments, the emulsion system can consist of butanone, water, and epichlorohydrine (ratio 1:1:1) in the presence of 2% emulsifier at pH 9-10. In some embodiments, the pH of the solution is controlled by the addition of a sodium hydroxide solution. In some embodiments, the sodium hydroxide solution is a 20% sodium hydroxide solution.

In some embodiments, the lignomethylol has a formula of

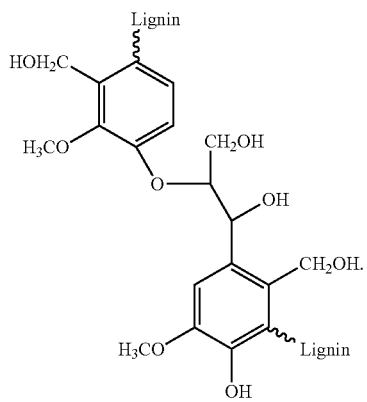

In some embodiments, the method also comprises contacting the lignomethylol or the lignosulphonate methylol with an amino compound to produce an aminolignin derivative. In some embodiments, the aminolignin derivative is water soluble. In some embodiments, the amino compound is ammonia. In some embodiments, the amino compound is a diamino compound. In some embodiments, the ammonia is ammonia gas under pressure, such as with an autoclave reaction system. Other examples of amino compounds that can be used include, but are not limited to, ethylene diamine, diethylenetriamine, tetraethylenepentamine, monoethanolamine, diethanolamine, triethanolamine, alkylamines (mono, di, or tri alkylamines), isophorone diamine, hydroxylamine, and hydrazine. The amino compound can be in the form of a liquid or solution.

In some embodiments, the aminolignin derivative has a formula of Formula I,

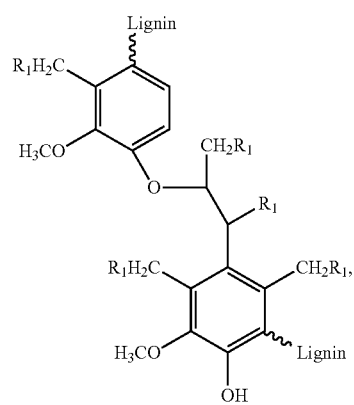

wherein each $R_1$ is independently selected from the group consisting of $NH_2$, $NH_2CH_2CH_2NH_2$, diethylenetriamine, trieethylenetetraamine, tetraethylenepentaamine, hydroxylamine, hydrazine, monoethanoloamine, diethanolamine, and triethanolamine. In some embodiments, each $R_1$ is identical to one another.

In some embodiments, the methylol compound is contacted with ammonia gas. In some embodiments, the methylol compound is contacted with ammonia gas under pressure of about 1 to 2 atm. In some embodiments, the reaction occurs at a temperature of about 60 to about 80° C. In some embodiments, the reaction is allowed to occur for about 1 to about 3 or about 2 to about 3 hours. The reaction will lead to the production of a lignoamine resins. Other lignoamine derivatives can be prepared by, for example, dissolving the ligno methylols in the amino compounds. The solutions can then be heated with, for example, continuous mixing at 60 to 80° C. for about 2 to 3 hours. The unreacted amine compound can be separated and recycled, thus leading to cost savings by ensuring that the reagent is efficiently used.

In some embodiments, the ligno amine derivatives can then be transformed into their aminoglycidyl ether derivatives. In some embodiments, the aminolignin that is produced is not dry and contains water. Therefore, in some embodiments, the method further comprises drying the aminolignin. The aminolignin can be dried until the water content is reduced by about, or at least, 10, 20, 30, 40, 50, 60, 70, 80, 90, 95, 96, 97, 98, or 99%. In some embodiments, the aminolignin is dried until the water content is less than 0.1%. by using drying agents such as, but not limited to, molecular sieves. or drying under vacuum for some solid ligno amine derivatives.

In some embodiments, the method further comprises contacting the amino lignin with a compound to produce a surfactant. In some embodiments, the amino lignin is contacted with ethanolamine (e.g., mono, di, and tri), a hydroxycarboxylic acid salt, a polyhydroxycarboxylic acid, an isocyanate terminated polyalkylene oxide, an epichlorohydrine, a hydroxycarboxylic acid salts, or polyhydroxylic acid salts, to produce a surfactant.

In some embodiments, the method comprises contacting the aminolignin with epichlorohydrine at a temperature of about 0 to about 10° C. to produce a ligno aminoepoxy resin. In some embodiments, the aminolignin is contacted with epichlorohydrine at a pH of about 9 to about 10. In some embodiments, the pH of the solution is controlled by the addition of a sodium hydroxide solution or other basic solution. In some embodiments, the sodium hydroxide solution is a 20% sodium hydroxide solution. In some embodiments, the resin is produced in an emulsion system.

In some embodiments, the resin has a formula of

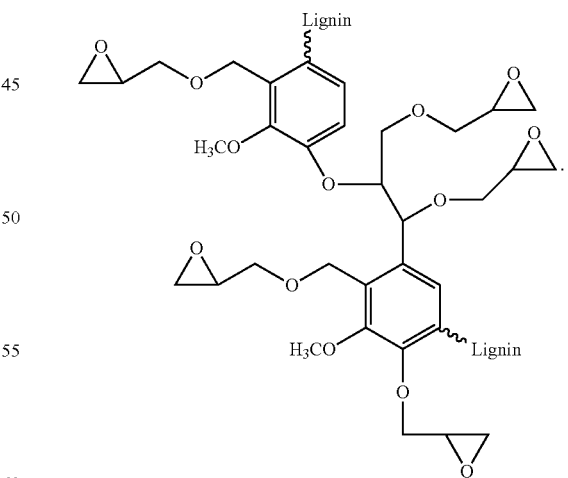

In some embodiments, the emulsion system comprises ketone, water, and epichlorohydrine. Examples of ketones that can be used include, but are not limited to, butanone,2-pentanone,2-hexanone,2-isohexanone and the like. In some embodiments, the ratio of the ketone to water to epichlorohydrine is 1:1:1 weight ratio. In some embodiments, the reaction is performed in the presence of an emulsifier. Examples of the emulsifier is cetrimide, or molecular surfactants. In some embodiments, the emulsifier is 1-3% weight % of the reactants. In some embodiments, the mixture is mixed for about, or at least, 1, 2, 3, 4, or 5 hours. The emulsified epoxy can then be used as a water based system specifically for epoxy derived from low molecular weight lignin. In some embodiments, the emulsion is demulsified. In some embodiments, the water is separated and the ketone and the unreacted epichlorohydrine are isolated and can be reused. The ketone and unreacted epichlorohydrine can be isolated by distillation under reduced pressure. Reduced pressure can be, for example, about 0.1 mm Hg.

In some embodiments, the method further comprises contacting the lignoaminoresin with phosgene, carbon monoxide, or carbon dioxide to produce a polyisocyanate. In some embodiments, the lignoaminoresin is dissolved in diethylketone or ethylacetate. The gases (e.g. phosgene, carbon monoxide, or carbon dioxide, or any combination thereof) can be passed through (e.g. bubbled) the solution. In some embodiments, the excess unreacted gas can be flushed or removed out by passing through dry nitrogen gas and/or decomposing the unreacted gases by contacting with KOH or other suitable basic solution and/or can be separated and recycled. The polyisocyante (e.g. lignoisocyante) and derivatives thereof can be used as a foamed hydrogel active gradient, polyurethane active gradient, crosslinking agent, and interpenetrating polymer network (IPN).

Methods of curing lignoamino epoxy resins are also provided. In some embodiments, the method of curing comprises contacting the ligno aminoepoxyresin with a water soluble aminolignin. The method comprises, in some embodiments, contacting an amount of each according to their epoxy equivalent weight ("EEW"). For example, for a commercial epoxy resin that has an epoxy equivalent weight of 190, then when it is cured with amine hardener with an amine equivalent weight 114, then each 190 g of epoxy will require 114 g of the hardener as curing agent. The reaction can then be cured at room temperature. The cured product can be, for example, a coating film.

In some embodiments, compositions comprising one or more of the following are provided: amino lignin derivatives (e.g., monoamino lignin, diaminolignin, triaminolignin, oligoaminolignin), lignoethylenediamine derivatives (e.g., mono, di, tri, and oligoethylenediamine derivatives), lignodiethylenetriamine derivatives (e.g., mono, di, tri and oligo derivatives), lignotriethylenetetramine derivatives (e.g., mono, di, tri and oligo derivatives), lignoethanolamine derivatives (e.g., mono, di, tri and oligomonoethanolamine derivatives), lignodiethanolamine derivatives (e.g., mono, di, tri and oligodiethanolamine derivatives), lignotriethanolamine derivatives (e.g., mono, di, tri and oligo-tri, ethanolamine derivatives), lignohydrazine derivatives, which were found to be decomposed to lignoamine derivatives, lignohydroxylamine derivatives, (e.g., mono, di, tri and oligohydroxylamine derivatives), or lignoisophoronediamine derivatives (e.g., mono, di, tri and oligoisophoronediamine derivatives), or any combination thereof.

The compounds described herein can be used for many applications. For example, the water based ligno epoxy resins and water based lignoamine hardeners that can be used as environmentally safe with zero volatile organic content (VOC) alternatives for resins used in coatings, floorings, adhesives, binders, additives, lubricants, and thermosetting resins. Accordingly, in some embodiments, a coating, a flooring, an adhesive, a binder, an additive, a lubricant, and a thermosetting resin comprising one or more of the compounds described herein are provided.

EXAMPLES

Example 1

Preparation of Lignoepoxy Resin

A 500 ml flanged top five neck reaction vessel fitted with mechanical stirrer, thermometer, condenser and separating funnel was immersed in thermo stated oil bath. The vessel was charged with 75 g of methylol lignin with number of methylol groups about 3 (prepared from low molecular weight lignin under condition described in Table 1) was dissolved in 100 g of butanone. 100 g of epichlorohydrine was added and 100 g of distilled water was added. The system was flashed with nitrogen for 10 minutes with mixing. 2 g of cetrimide surfactant was added with efficient mixing and the temperature was raised to 60° C. Then 50 ml of 20% sodium hydroxide was added portion wise over three hours to keep the pH at 9-10. The reaction was continued for one hour. Samples were taken each 30 minutes for curing test. At the end of the reaction the butanone and the excess of unreacted epichlorohydrine was distilled off. The residue was found to contain two components water soluble lignoepoxy resin 52% and insoluble residue 48% solid lignoepoxy resins (the yield was 85% based on methylol lignin).

The two fraction were characterized by instrumentation such as IR, NMR, and DSC. Both components were found to undergo curing with hardeners or thermal curing when examined by DSC. The epoxy equivalent found from titration with HBr was found to be 2-3.2 g equivalent for the last three fractions.

Example 2

Preparation of Lignomethylolsulphonate Epoxy Resin

The same procedure as described in Example 1 was performed using lignomethylolsulphonate instead of lignomethylol without using the emulsifier as lignomethylolsulphonate acts as self-emulsifying material. The reaction provided a higher ratio of water soluble to the solid lignoepoxy resin.

Example 3

Effect of Stoichiometric Ratio of NaOH/Lignomethylol on the Yield and Epoxy Equivalent The effect of stoichiometric ratio of NaOH/lignomethylol was investigated using the same procedure described in Example 1. It was found that increasing the NaOH/Lignomethylol by 10-20% enhances the epoxy equivalent by 10-15%. Exemplary results are shown in Table 2.

TABLE 2

Exemplary experimental data obtained in the epoxidation of lignomethylols and lignosulphonate methylols at reaction conditions that gave optimum results.

| Reactants/epichlorohydrine | Temp. °C. | pH | Time/ hours | Epoxy equivalent (g/eq · wt) | Yield |
|---|---|---|---|---|---|
| Methylolated lignin | 60 | 9 | 3 | 2.8 | 87 |
|  | 70 | 10 | 3.5 | 3.2 | 82 |
| Lignosulphonated methylols | 60 | 9 | 3 | 2.1 | 92 |
|  | 70 | 10 | 3.5 | 2.4 | 84 |

Example 4

Effect of Reaction Time on the Yield and Epoxy Equivalent

The same procedure as described in Examples 1-3 was used. Fractions were taken each 30 minutes up to 6 hours. Analysis of the samples indicate that extending the addition time (3-4 hours) increases the epoxy equivalent and lignoepoxy yield by 10-15%. Yield and epoxy equivalent starts to decrease after 4 hours due to the epoxy ring opening polymerization. Samples of the obtained data are shown in Table 2.

Table 1 shows exemplary conditions used in the preparation of lignomethylols and lignosulphonate methylols

| Wt ratio Lignin:aldehyde | Temperature. °C. | Reaction time (h) | pH | $CH_2OH$/ Structural unit of lignin. | Average of 3 exp | Number of $CH_2OH$ |
|---|---|---|---|---|---|---|
| 3.6:1* | 65-70 | 3.0 | 9-10 | 2.84-3.3 | 2.86 | 3.0 |

Example 5

Preparation of Lignoamine Hardener

A three necked reaction vessel fitted with condenser, mechanical stirrer and thermometer was immersed in thermostated oil bath and was charged with 100 g of lignomethylols (number of methylol groups about 3 (prepared under the exemplary conditions described in Table 1), 200 g water, 33 g ethylene diamine, and 5 g (10% NaOH) was added drop wise to maintain the pH at 9-10. The system was heated to 60° C. The reaction was continued for three hours. The system was brought to reflux for an additional one hour. The unreacted ethylene diamine was distilled off, and the viscous residue lignoamine derivative (hardener) was water soluble with dark color. The hardener was used as curing agent for epoxy resin both commercial and the lignoepoxy resins that were prepared according to Examples 1-3. All the sample were cured after 16 hours (e.g. overnight).

Example 6

Preparation of Amino Lignin Hardener 250 ml laboratory autoclave was charged with 20 g of lignomethylol, 100 ml water, 3 g NaOH, the reactor was closed firmly and compressed ammonia gas was introduced. The reaction was carried out at 60° C. under two atmosphere pressure for 3 hours. The product was separated and tested for curing commercial epoxy resin and ligno epoxy resins prepared in examples 1-4. All the samples tested were found to be cured overnight.

Example-7

Preparation of Lignohydrazine Hardeners

The autoclave was charged with 20 g lignomethylol, 100 g water, 2 g NaOH, and 30 g 20% hydrazine solution in water. The reactor was secured then the system was heated gradually with continuous mixing to 60° C. The reaction was continued for 3 hours. The product was separated and tested for curing. The product was found to have similar structure and hardening efficiency to the hardeners prepared in Example 6, indicating that hydrazine has decomposed to ammonia which then reacted with methylol lignin, or the hydrazine lignin derivative was formed first then it decomposed to lignoamine and ammonia.

Example 8

Preparation of Lignoethanolamine Hardener

The reaction vessel was charged with 100 g lignomethylol, 100 g water, 3 g NaOH, and 35 g of mono ethanolamine, the reaction was brought to reflux for two hours, then cooled to room temperature the unreacted ethanol amine was distilled off, the highly viscous semisolid product was tested for curing commercial epoxy resin and lignoepoxy resins prepared in Examples 1-4, the hardener showed very low curing efficiency at ambient temperature, but underwent fully cured at 70° C. for 6 hours.

Example 9

Preparation of Lignoisocyanate Derivatives

In a closed phosegenation system 25 g of lignoamine derivative prepared according to Example 6 was dissolved in 100 g of dichloromethane. 30 g of triethylamine was added as an HCl acceptor. The reaction vessel was immersed in a cooling bath to maintain the temperature at 25-30° C. Phosgene, produced instantly using simple Kip system by adding concentrated sulphuric acid to chloroform, was bubbled slowly at 1 g per 10 minutes through the reaction system with continuous mixing and under extremely dry condition. At the end of the reaction the system was flushed with $N_2$ gas to remove the unreacted and dissolved phosgene. The outlet gas was bubbled through alcoholic KOH to decompose the phosgene.

The residual product was soluble in methylene chloride. Evaporation of methylene chloride gave highly viscous dark colored lignoisocyanate derivatives, the product was tested to cure some commercial polyols used in polyurethane technology.

Polyisocyanate products can be prepared by replacing phosgene with CO₂ or CO in an autoclave under high pressure.

Example 10

Curing of Lignoepoxy Resin with the Lignoamino Hardeners

Several curing experiments were carried out by mixing stoichiometric ratios of ligno amine prepared in Example 5 with lignoepoxy from those described in Examples 1-4 or with commercial epoxy. The curing of the samples was investigated by DSC. The glass transition temperature of the cured samples was found to be much higher than standard commercial epoxy resins and their hardeners by about 10-20° C. The values found for some resins ranged between 80-120° C. For example, when the lignoamino hardener was used for curing Bisphenol-A diglycidylepoxy resins, the glass transition of the cured product increased by about 10° C.

Example 11

Emulsion Ligno Epoxy Resin for Coating Application

The emulsion lignoepoxy prepared according to Examples 1 and 2 were cured with equivalent amount of lignoamino hardener, which was prepared according to Example-5, (5 g of ligno epoxy emulsion+1.5 g of lignoamino hardener) and mixed and applied to concrete a surface, and left to cure at ambient temperature overnight. A dark brown colored shiny coated surface was obtained.

Example 12

Curing of Lignoepoxy Emulsion by Commercial Hardener 5 g of ligno epoxy emulsion was cured with 0.9 g of commercial hardener/Parchem product 8050. The emulsion was applied to concrete surface and left overnight. The coated surface showed improved abrasion properties as compared to surface coating of Example 10.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method of making a lignomethylol or a lignosulphonate methylol, the method comprising contacting a lignin or a lignosulphonate with formaldehyde or paraformaldehyde or glyoxal under conditions sufficient to produce the lignomethylol or the lignosulphonate methylol, wherein the lignomethylol has a formula of:

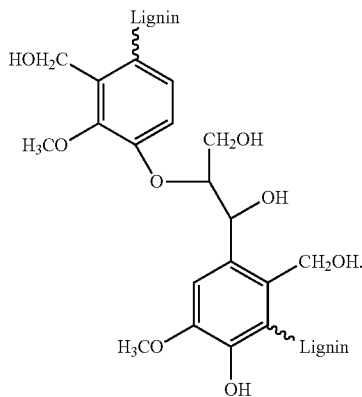

2. The method of claim 1, further comprising epoxidizing the lignomethylol or the lignosulphonate methylol under basic pH conditions to produce a lignomethylol epoxy or a lignosulphonate methylol epoxy.

3. The method of claim 1, further comprising contacting the lignomethylol or the lignosulphonate methylol with ammonia or an amino compound to produce a water soluble aminolignin derivative.

4. The method of claim 3, wherein the aminolignin derivative has a formula of Formula I,

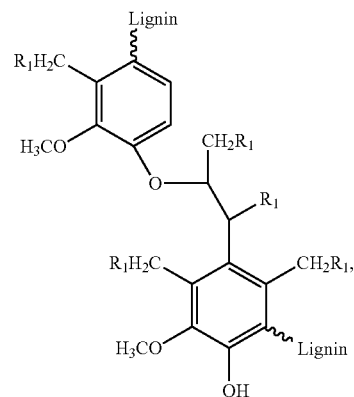

wherein each $R_1$ is independently selected from the group consisting of $NH_2$, —$NHCH_2CH_2NH_2$, diethylenetriamine, triethylenetetraamine, tetraethylenepentaamine, hydroxylamine, hydrazine, monoethanoloamine, diethanolamine, and triethanolamine.

5. The method of claim 3, wherein the amino compound is a monoethanolamine, a monoalkylamine, dialkylamine, trialkyl amine, ethylene diamine, diethylenetriamine, tetraethylene pentamine, mono ethanol amine, diethanolamine, triethanolamine, isophorone diamine, hydroxylamine, or hydrazine.

6. The method of claim 3, further comprising drying the water soluble aminolignin derivative.

7. The method of claim 3, further comprising contacting the amino lignin with ethanolamine, a hydroxycarboxylic acid salt, a polyhydroxycarboxylic acid, an isocyanate terminated polyalkylene oxide, an epichlorohydrine, a hydroxycarboxylic acid salt, or a polyhydroxylic acid salt to produce a surfactant.

8. The method of claim 3, further comprising contacting the aminolignin with epichlorohydrine at a temperature of about 0-10° C. to produce a ligno aminoepoxy resin.

9. The method of claim 8, wherein the ligno aminoepoxy resin has a formula of:

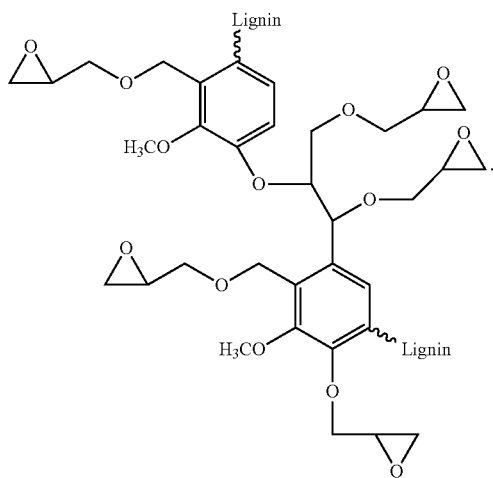

10. The method of claim 8, further comprising contacting the ligno amino resin with phosgene, carbon monoxide, or carbon dioxide to produce a lignoisocyanate derivatives.

11. The method of claim 1, wherein the method does not comprise a volatile organic compound.

12. A method of curing an ligno amino epoxy resin, the method comprising contacting a ligno aminoepoxyresin with a water soluble aminolignin according to their epoxy equivalent weight for a sufficient time at room temperature until the resin is cured.

13. A composition comprising a compound having a formula of

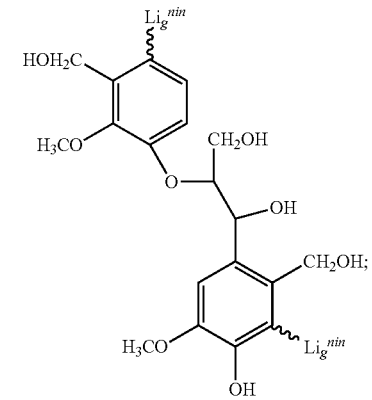

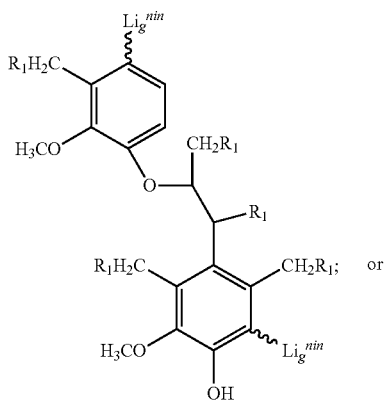

-continued

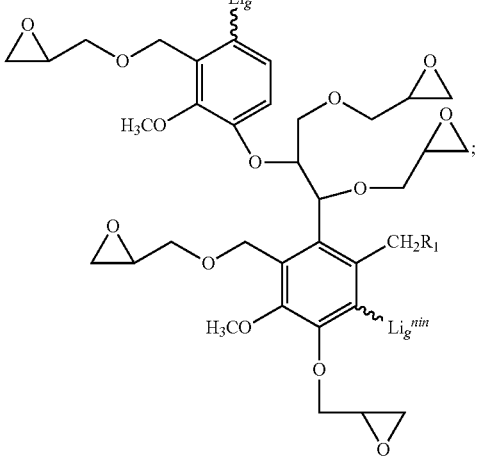

wherein each $R_1$ is independently selected from the group consisting of $NH_2$, $NH_2CH_2CH_2NH_2$, diethylenetriamine, triethylenetetraamine, tetraethylenepentaamine, hydroxylamine, hydrazine, monoethanoloamine, diethanolamine, and triethanolamine.

14. The composition of claim 13, wherein the compound has a formula of

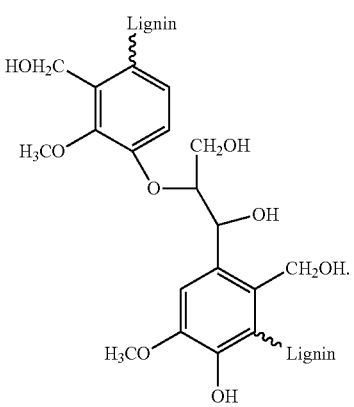

15. The composition of claim 13, wherein the compound has a formula of Formula I,

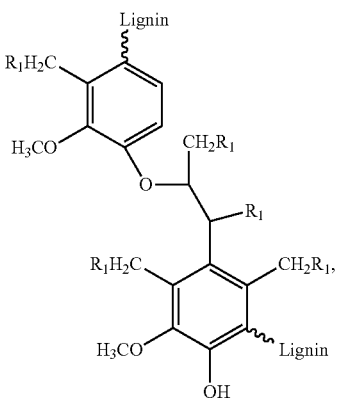

wherein each $R_1$ is independently selected from the group consisting of $NH_2$, $NH_2CH_2CH_2NH_2$, diethylenetriamine, triethylenetetraamine, tetraethylenepentaamine, hydroxylamine, hydrazine, monoethanoloamine, diethanolamine, and triethanolamine.

16. The composition of claim 13, wherein the composition compound has a formula of

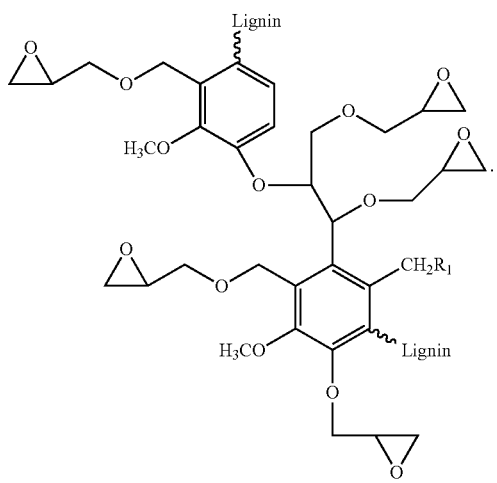

wherein $R_1$ is independently selected from the group consisting of $NH_2$, $NH_2CH_2CH_2NH_2$, diethylenetriamine, triethylenetetraamine, tetraethylenepentaamine, hydroxylamine, hydrazine, monoethanoloamine, diethanolamine, and triethanolamine.

17. The method of claim 12, wherein the ligno aminoepoxyresin has a formula of:

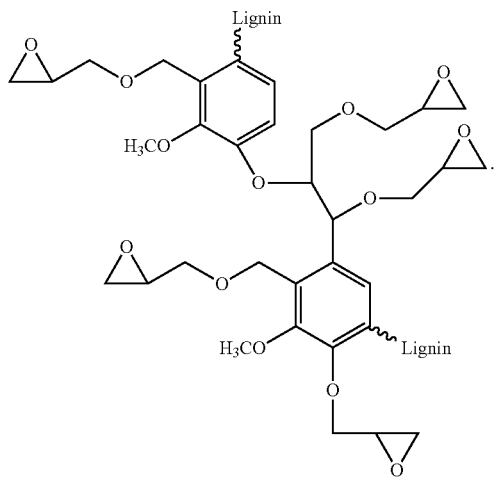

* * * * *

UNITED STATES PATENT AND TRADEMARK OFFICE
CERTIFICATE OF CORRECTION

Page 1 of 3

PATENT NO. : 9,006,369 B2
APPLICATION NO. : 13/814866
DATED : April 14, 2015
INVENTOR(S) : Adam It is certified that error appears in the above-identified patent and that said Letters Patent is hereby corrected as shown below:

In the specification,

In Column 1, Line 10, delete "EPDXY" and insert -- EPOXY --, therefor.

In the claims,

In Column 15, Lines 35-45, Claim 13, delete " 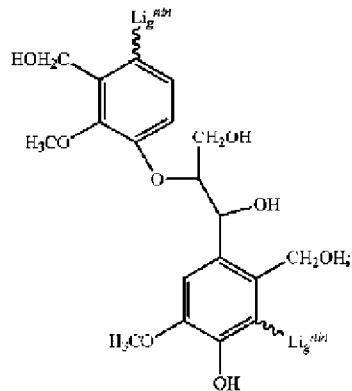 " and insert -- 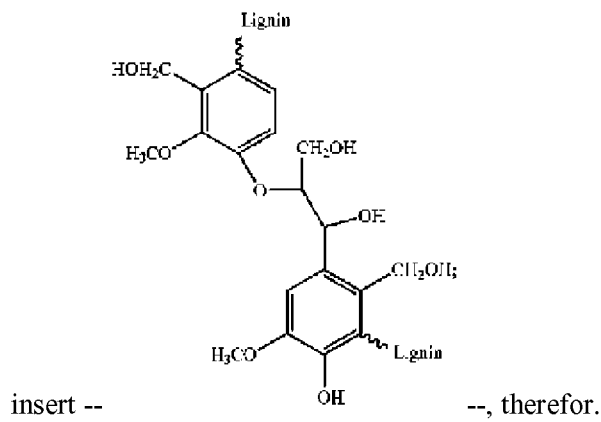 --, therefor.

Signed and Sealed this
Fifteenth Day of March, 2016

Michelle K. Lee
*Director of the United States Patent and Trademark Office*

In Column 15, Lines 45-65, Claim 13, delete " 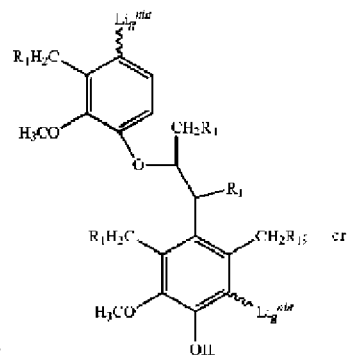 " and
insert -- 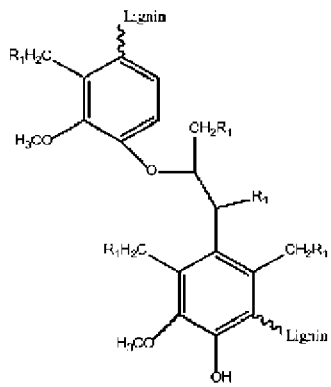 I; or --, therefor.
In Column 16, Lines 1-20, Claim 13, delete " 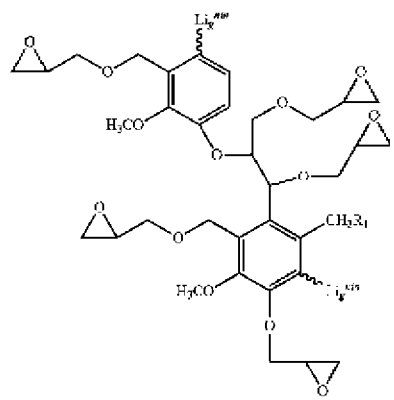 " and insert -- 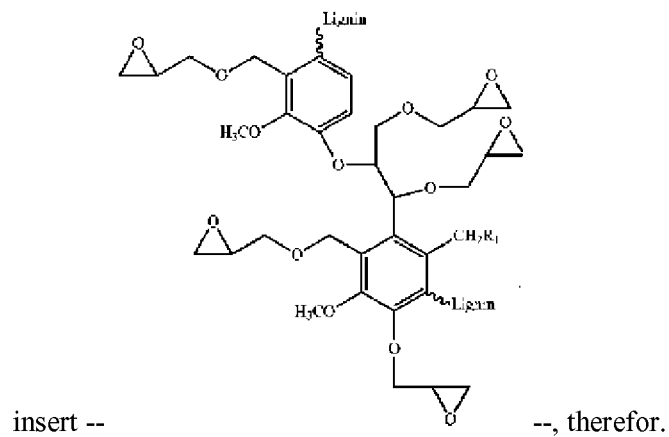 --, therefor.
In Column 17, Line 7, Claim 16, delete "the composition" and insert -- the --, therefor.